Patented May 23, 1933

1,910,488

UNITED STATES PATENT OFFICE

MAX WEILER, OF WIESDORF-ON-THE-RHINE, KARL BERRES, OF COLOGNE-MULHEIM, AND BERTHOLD WENK AND HERMANN STÖTTER, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY

NEW HYDROXY-ALKYL-TRIPHENYLMETHANE DERIVATIVES

No Drawing. Application filed January 24, 1930, Serial No. 423,261, and in Germany January 30, 1929.

The present invention relates to a process of preparing condensation products from p-alkylated phenolic compounds and aromatic aldehydes which are at least once substituted in the nucleus and to the new products obtainable thereby.

Our new compounds may be represented by the probable general formula:

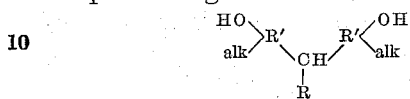

wherein R and R' stand for aromatic nuclei, such as benzene or naphthalene nuclei, "alk" stand for alkyl groups, R being at least once substituted by halogen, a hydroxy group or a sulfonic acid group, the alkyl and hydroxy groups in each of the nuclei R' standing in para-position to each other, and wherein R' may be otherwise substituted by halogen atoms, alkyl, or alkyloxy groups. These compounds are obtainable by reacting with an about molecular quantity of an aromatic aldehyde, being at least once substituted in the nucleus by halogen, a hydroxy group or a sulfonic acid group, upon an about double-molecular quantity of a p-alkylated phenol which may be substituted otherwise by halogen atoms, alkyl or alkoxy groups in the presence of a suitable condensing agent, such as sulfuric acid, hydrochloric acid in mixture with glacial acetic acid, zinc chloride and the like. The temperature at which the reaction takes place varies in wide limits, but may range in most cases from about 15–100° C.; the time required for finishing the condensation process may vary from about 3 hours to about 3 days.

Our new products generally are colorless or nearly colorless powders, which are soluble in alkalies, difficultly soluble in water except those which contain a sulfo group, and are efficacious in moth-proofing materials liable to attack by moth.

The following examples illustrate our invention, without limiting it thereto:

*Example 1.*—15 parts by weight of ortho-chloro-para-cresol (CH$_3$: OH : Cl = 1 : 4 : 5) and 10.4 parts by weight of sodium benzaldehyde-o-sulfonate are introduced with cooling into 150 parts by weight of sulfuric acid of 66° Bé. The temperature is allowed to raise to 20–25° C. in the course of 15 minutes; the reaction mass is kept at this temperature for about 15 minutes while stirring and then poured on 50 parts by weight of ice; the product which separates, having in its free state the following formula:

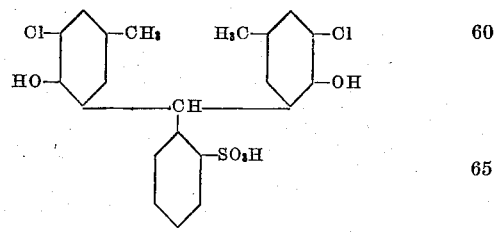

is filtered; any unchanged ortho-chloro-para-cresol is driven off with steam and, by the addition of ammonia, the condensation product is separated in the form of its ammonia salt (needles). The aqueous solution thereof yields with ferric chloride a sparingly soluble blue precipitate and with calcium or aluminium salts sparingly soluble white precipitates.

*Example 2.*—68.1 parts by weight of p-cresol and 62.4 parts by weight of sodium benzaldehyde-o-sulfonate are stirred in 450 parts by weight of 70% sulfuric acid at about 50° C. until the reaction is complete. The condensation product is purified as in Example 1, and isolated in the form of the sodium salt. In its free state it has the following formula:

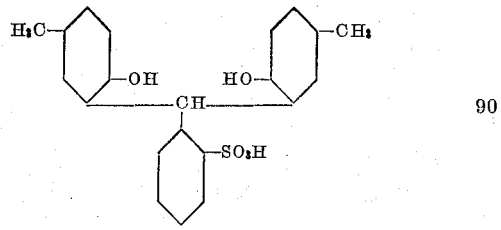

It behaves towards ferric chloride, calcium salts and aluminium salts in the same manner as the product described in Example 1.

Other phenols, for example, as—meta-xylenol or phenols containing higher alkyl groups in the nucleus, behave like the phenols above specified. Like the ortho-sulfo-benzaldehyde behave also isomers thereof, chlorinated benzaldehydes and hydroxy- or sulfo derivatives thereof, as well as naphtho aldehydes. The acid can also be diluted with acetic acid or other organic solvents instead of with water. The resulting products are suitable for protecting animal fibers, furs, feathers and the like against attack by insect pests.

We claim:

1. The process which comprises causing an about molecular quantity of an aromatic aldehyde, being at least once substituted in the nucleus by halogen, a hydroxy group or a sulfonic acid group, and about two molecular quantities of a p-alkylated phenol which may be otherwise substituted by halogen atoms, alkyl or alkoxy groups in the nucleus to react upon each other in the presence of a condensing agent.

2. The process which comprises causing an about molecular quantity of an aromatic aldehyde, being at least once substituted in the nucleus by halogen, a hydroxy group or a sulfonic acid group, and about two molecular quantities of a p-alkylated phenol which may be otherwise substituted by halogen atoms, alkyl or alkoxy groups in the nucleus to react upon each other in the presence of a condensing agent at a temperature of about 15–100° C. and for a time ranging from three hours to three days.

3. The process which comprises causing an about molecular quantity of a benzaldehyde, which is at least once substituted in the nucleus by halogen, a hydroxy group or a sulfonic acid group, and about two molecular quantities of a p-alkylated phenol which may be substituted by a halogen atom in the nucleus to react upon each other in the presence of a condensing agent at a temperature of about 15–100° C. and for a time ranging from three hours to three days.

4. The process which comprises causing an about molecular quantity of sodium benzaldehyde-o-sulfonate and about two molecular quantities of o-chloro-p-cresol to react upon each other in sulfuric acid of 66° Bé. at a temperature of about 20–25° C.

5. As new products compounds of the probable general formula:

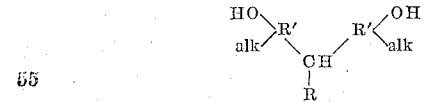

wherein R and R′ stand for aromatic nuclei, "alk" stand for alkyl groups, R being at least once substituted by halogen, a hydroxy group or a sulfonic acid group, the alkyl and hydroxy groups in each of the nuclei R′ standing in para-position to each other and wherein R′ may be otherwise substituted by halogen atoms, alkyl or alkoxy groups, being generally colorless or nearly colorless powders, which are insoluble in water, except those as contain a sulfo group, and being efficacious in moth-proofing materials liable to attack by moths.

6. As new products compounds of the probable general formula:

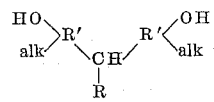

wherein R and R′ stand for benzene nuclei, "alk" stand for alkyl groups, R being at least once substituted by halogen, a hydroxy group or a sulfonic acid group, the alkyl and hydroxy groups in each of the nuclei R′ standing in para-position to each other and wherein R′ may be otherwise substituted by halogen atoms, alkyl or alkoxy groups, being generally colorless or nearly colorless powders, which are insoluble in water, except those as contain a sulfo group, and being efficacious in moth-proofing materials liable to attack by moths.

7. As new products compounds of the probable general formula:

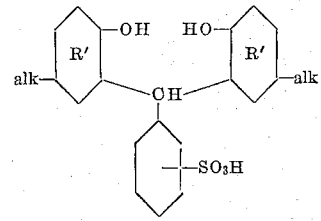

wherein the benzene nuclei R′ may be substituted by halogen atoms, "alk" stand for alkyl groups, being generally colorless or nearly colorless powders, soluble in water and being efficacious in moth-proofing materials liable to attack by moths.

8. As a new product the compound of the probable formula:

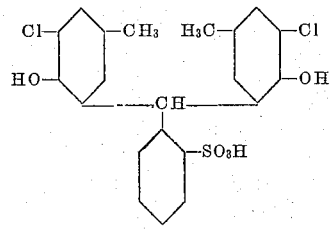

being in form of its ammonium salt a whitish crystalline substance, easily soluble in water, yielding in aqueous solution with ferric chloride a sparingly soluble blue precipitate and with calcium or aluminium salts sparingly soluble white precipitate, and being efficacious in moth-proofing materials liable to attack by moths.

In testimony whereof, we affix our signatures.

MAX WEILER.
KARL BERRES.
BERTHOLD WENK.
HERMANN STÖTTER.